(12) United States Patent
Lu et al.

(10) Patent No.: US 10,080,160 B2
(45) Date of Patent: Sep. 18, 2018

(54) METHOD FOR RESOURCE RESERVATION EXECUTED BY A NETWORK ELEMENT OF A MOBILE COMMUNICATION NETWORK FOR A COMMUNICATION CONNECTION BETWEEN A MOBILE DEVICE AND A COMMUNICATION DESTINATION

(71) Applicant: VODAFONE GMBH, Duesseldorf (DE)

(72) Inventors: Yang Lu, Duesseldorf (DE); Peter Wild, Krefeld (DE); Juergen Caldenhoven, Duesseldorf (DE); Alexej Kulakov, Duesseldorf (DE)

(73) Assignee: VODAFONE GMBH, Duesseldorf (DE)

( * ) Notice: Subject to any disclaimer, the term of this patent is extended or adjusted under 35 U.S.C. 154(b) by 22 days.

(21) Appl. No.: 15/234,309

(22) Filed: Aug. 11, 2016

(65) Prior Publication Data

US 2017/0048755 A1 Feb. 16, 2017

(30) Foreign Application Priority Data

Aug. 12, 2015 (EP) ..................................... 15180815

(51) Int. Cl.
*H04W 4/00* (2018.01)
*H04W 28/26* (2009.01)
(Continued)

(52) U.S. Cl.
CPC .......... *H04W 28/26* (2013.01); *H04L 47/803* (2013.01); *H04M 15/10* (2013.01); *H04W 4/001* (2013.01);
(Continued)

(58) Field of Classification Search
CPC ....... H04M 15/10; H04W 4/001; H04W 4/24; H04W 28/26; H04W 72/087; H04W 76/022; H04W 76/027; H04L 47/803
(Continued)

(56) References Cited

U.S. PATENT DOCUMENTS

| | | | | |
|---|---|---|---|---|
| 7,623,530 B2 * | 11/2009 | Hurtta | ..................... | H04L 47/15 370/229 |
| 7,729,308 B2 * | 6/2010 | Taneja | ................ | H04L 27/2608 370/329 |
| 7,826,353 B2 * | 11/2010 | Honkasalo | .......... | H04L 41/0893 370/230 |
| 7,852,848 B2 * | 12/2010 | Yin | ................... | H04L 29/06027 370/395.2 |
| 7,953,035 B2 * | 5/2011 | Gopal | ................... | H04W 28/18 370/328 |
| 8,811,281 B2 * | 8/2014 | Leung | ................... | H04W 76/04 370/328 |
| 8,953,443 B2 * | 2/2015 | Yang | ..................... | H04L 47/127 370/230 |
| 8,976,685 B1 * | 3/2015 | Venizelos | ............... | H04W 8/18 370/252 |
| 9,807,773 B2 * | 10/2017 | So | ......................... | H04L 47/808 |
| 2006/0135172 A1 * | 6/2006 | Dronne | .................. | H04L 47/10 455/452.2 |

(Continued)

*Primary Examiner* — Man Phan
(74) *Attorney, Agent, or Firm* — Grossman, Tucker, Perreault & Pfleger, PLLC

(57) ABSTRACT

A method for resource reservation executed by a network element of a mobile communication network for a communication connection between a mobile device and a communication destination includes: receiving a request for establishing the communication connection between the mobile device and the communication destination originating from an application of the mobile device; determining the type of application requesting the communication connection between the mobile device and the communication destination; estimating the required Quality of Service (QoS) for the requested communication connection with respect to the upload and/or download requirements under consideration of the type of application requesting the communication connection between the mobile device and the communication destination; checking whether the communication connection between the mobile device and the communication destination can provide the estimated required QoS; and reserving if possible the resources for the communication connection between the mobile device and the communication destination to provide the required QoS.

19 Claims, 3 Drawing Sheets

(51) Int. Cl.

| | |
|---|---|
| *H04W 76/18* | (2018.01) |
| *H04W 4/50* | (2018.01) |
| *H04W 76/12* | (2018.01) |
| *H04L 12/927* | (2013.01) |
| *H04M 15/10* | (2006.01) |
| *H04W 4/24* | (2018.01) |
| *H04W 72/08* | (2009.01) |
| *H04W 76/02* | (2009.01) |

(52) U.S. Cl.
CPC ............... *H04W 4/24* (2013.01); *H04W 4/50* (2018.02); *H04W 72/087* (2013.01); *H04W 76/022* (2013.01); *H04W 76/027* (2013.01); *H04W 76/12* (2018.02); *H04W 76/18* (2018.02)

(58) Field of Classification Search
USPC .......... 370/230–253, 329–395; 709/212–235
See application file for complete search history.

(56) References Cited

U.S. PATENT DOCUMENTS

| | | |
|---|---|---|
| 2008/0317054 A1 | 12/2008 | Yin |
| 2013/0272121 A1* | 10/2013 | Stanwood ........... H04L 47/2475 370/230 |
| 2014/0293778 A1* | 10/2014 | Fernandez-Palacios Gimenez ..... H04L 45/302 370/230 |
| 2015/0049606 A1 | 2/2015 | So et al. |

* cited by examiner

METHOD FOR RESOURCE RESERVATION EXECUTED BY A NETWORK ELEMENT OF A MOBILE COMMUNICATION NETWORK FOR A COMMUNICATION CONNECTION BETWEEN A MOBILE DEVICE AND A COMMUNICATION DESTINATION

TECHNICAL FIELD

The present invention relates to a method for resource reservation executed by a network element of a mobile communication network for a communication connection between a mobile device and a communication destination. The invention further relates to a network element or mobile device being adapted to perform at least partially the method.

BACKGROUND INFORMATION

Once a user equipment (UE) connects to an Long Term Evolution (LTE) mobile communication network a default bearer is assigned, which remains as long as the UE is connected to the LTE mobile communication network. The UE can have additional default bearers as well. Each default bearer comes with a separate IP address. Usually default bearers provide best effort service, which means that the quality and transmission speed of the connection may depend on the network load and/or time of the day. The default bearer has a non-Guaranteed Bit Rate (non-GBR).

A dedicated bearer can be created on top of a default bearer to provide a dedicated tunnel to one or more specific data traffic (i.e. VoIP, video, etc.). The dedicated bearer uses the IP address of the default bearer and therefore does not occupy an additional IP address. Dedicated bearers mostly provide a Guaranteed Bit Rate (GBR), but can also provide non-GBR service. The GBR per dedicated bearer can be specified individually for uplink and downlink. The transmission resources for a GBR dedicated bearer are reserved and blocked by an admission control function. However, it is possible that multiple applications share a dedicated bearer and thus, the GBR of the dedicated bearer will be used by multiple applications and it is not guaranteed that every application can use the GBR of the dedicated bearer.

Further, a Quality of Service (QoS) Class Indicator (QCI) can be assigned to either a default bearer or a dedicated bearer. The QCI specifies the treatment respectively handling, like e.g. scheduling weight, admission thresholds, queue management thresholds, link-layer protocol configuration, etc. of the traffic send over the bearer between the UE and the LTE mobile communication network. The QCI specification with corresponding parameters and common applications are shown in the following table, as defined in the 3GPP TS 23.203 standard "Policy and Charging Control Architecture":

| QCI | Resource type | Priority | Packet delay budget | Packet error loss rate | Example Application |
|---|---|---|---|---|---|
| 1 | GBR | 2 | 100 ms | 1e-2 | Conversational Voice |
| 2 | GBR | 4 | 150 ms | 1e-3 | Conversational Video |
| 3 | GBR | 3 | 50 ms | 1e-3 | Gaming |
| 4 | GBR | 5 | 300 ms | 1e-6 | Non-conversational video |
| 5 | non-GBR | 1 | 100 ms | 1e-6 | IMS signaling |
| 6 | non-GBR | 6 | 300 ms | 1e-6 | Video, www, email, ftp |
| 7 | non-GBR | 7 | 100 ms | 1e-3 | Interactive gaming |
| 8 | non-GBR | 8 | 300 ms | 1e-6 | Video, www, email, ftp |
| 9 | non-GBR | 9 | 300 ms | 1e-6 | Video, www, email, ftp |

However, the QCI assigned to a bearer between the UE and the LTE mobile communication network is the same for the uplink and downlink data transmission. In case an application of the UE requires specific Quality of Service (QoS) characteristics for one direction of the bearer to be set up, the same resources would also be reserved for the other direction, even if not needed. Although examples are given for each QCI, the data transmission between the UE and the EPC is unaware of the application or application type transmitting the data.

SUMMARY

It is thus an object of the present invention to provide a method for a resource reservation executed by a network element of a mobile communication network for a communication connection between a mobile device and a communication destination which is aware of the Quality of Service (QoS) requirements of an application requesting the communication connection, especially with respect to the upload and download Quality of Service (QoS) requirements.

According to a first aspect of the invention the object is solved by a method for resource reservation executed by a network element of a mobile communication network for a communication connection between a mobile device and a communication destination comprising the steps of:
  receiving a request for establishing the communication connection between the mobile device and the communication destination originating from an application of the mobile device;
  determining the type of application requesting the communication connection between the mobile device and the communication destination;
  estimating the required Quality of Service (QoS) for the requested communication connection with respect to the upload and/or download requirements under consideration of the type of application requesting the communication connection between the mobile device and the communication destination;
  checking whether the communication connection between the mobile device and the communication destination can provide the estimated required Quality of Service (QoS); and
  reserving if possible the resources for the communication connection between the mobile device and the communication destination to provide the required Quality of Service (QoS).

A network element of a communication network, like for example a Node B of a mobile communication network according to an Universal Mobile Telecommunications System (UMTS)-standard or an evolved Node B of a mobile communication network according to a LTE-standard, receives a request for establishing a communication connection between a communication source, like a mobile device, and a communication destination. The request originates particularly from an application running on the mobile device. Preferably the request is send via a default bearer which is assigned once a mobile device connects to a mobile communication network. When receiving the request the network element of the communication network determines the type of application requesting the communication connection between the communication source and the communication destination. Once the network element has determined the type of application requesting the communication connection, the network element can estimate the required Quality of Service (QoS) for the requested communication connection under consideration of the type of application requesting the communication connection. The required Quality of Service (QoS) is advantageously estimated with respect to the upload and/or download requirements of the requested communication connection. After the network element has estimated the required Quality of Service (QoS) for the requested communication connection between the communication source and the communication destination, the network element can check whether a communication connection between the communication source and the communication destination can provide the estimated required Quality of Service (QoS). Particularly the network element can check whether there already exists a communication connection, like a dedicated bearer, between the communication source and the communication destination and whether this existing communication connection, like a dedicated bearer, can provide the estimated required Quality of Service (QoS). In case no communication connection, like a dedicated bearer, exists between the communication source and the communication destination the network element checks whether the communication network can establish a communication connection between the communication source and the communication destination with the estimated required Quality of Service (QoS). If possible the network element reserves the resources for the communication connection between the communication source and the communication destination to provide the required Quality of Service (QoS).

Quality of Service (QoS) in the sense of the present invention refers to the performance of the communication network, particularly the performance seen by the users of the communication network. The Quality of Service (QoS) can advantageously be quantitatively measured or estimated by considering the following parameters: error rates, bandwidth, throughput, transmission delay, availability, jitter, etc.

According to the invention a network element of a communication network determines the type of application requesting a communication connection between a communication source and a communication destination via the communication network. Once the network element knows the type of application it can estimate the required Quality of Service (QoS) for the requested communication connection. The network element or the communication network can comprise a database which maps different kinds of application to their required Quality of Service (QoS). Thus, the network element can for example query such a database after determining the type of application requesting a communication connection to estimate the required Quality of Service (QoS) for the communication connection. Alternatively the communication source can indicate the type of application in the request for establishing a communication connection. The type of application can further be determined for example by considering the communication destination, like specific server of a service provider as a communication destination, or specific features of the communication source, like a used port as part of the communication source. Finally the network element can check whether a communication connection between the communication source and the communication destination can provide the required Quality of Service (QoS) and if possible reserve the resources for the communication connection between the communication source and the communication destination.

Advantageously the inventive method can be solely executed by a network element of a communication network the communication source does not need to send its Quality of Service (QoS) requirements together with the request for establishing a communication connection. Particularly in case of a mobile device in a mobile communication network this can spare precious radio resources. The communication source only has to send a request for establishing a communication connection and the network element of the communication network takes care of the Quality of Service (QoS) requirements for the request. In case the communication network can provide the required Quality of Service (QoS) the communication connection will be established. Otherwise, the communication connection can be refused or the communication source can be informed that the communication network cannot provide the required Quality of Service (QoS) and the communication source can decide to establish the communication connection even if the communication network cannot provide the required Quality of Service (QoS) or to abandon the request for establishing a communication connection. To establish a communication connection even if the communication network cannot provide a required Quality of Service (QoS) the request for establishing a communication connection might contain a flag which indicates that the communication connection should be established irrespective of the Quality of Service (QoS) provided by the communication network.

Advantageously the network element considers the type of application and the Quality of Service (QoS) requirements of the type of application the resources of the communication network can be managed very efficiently. The currently known Quality of Service Class Identifier (QCI) do not consider the requirements of different types of applications, even when some example applications are given for the QCIs. Each QCI can for example comprise traffic of applications with differing Quality of Service (QoS) requirements, especially with differing Quality of Service (QoS) requirements for the upload and/or download. Because the inventive method considers the type of application requesting the communication connection the network element can estimated the required Quality of Service (QoS) and corresponding resources with a better granularity, which can safe resources of the communication network.

Actual mobile devices for mobile communication networks are pre-configured with a number of Access Point Names (APN) and/or Packet Data Network (PDN) Gateways (PGW), which have the function of a gateway between the backbone of a mobile communication network and a packet data network, to support different types of applications. Examples for such APNs are the Web-APN or Voice-over-LTE (VoLTE) APN. However, even using pre-configured APN/PGW does not provide a required Quality of Service (QoS). In contrast to this, according to the invention, the network element of the communication network can advantageously choose the APN/PGW dynamically for each received request and establish a communication connection between the communication source and communication destination using this APN/PGW. Thus, the resources of the communication network can be allocated more efficiently.

According to an aspect of the invention the method comprises the further step of allocating the reserved resources to the requested communication connection between the mobile device and the communication destination, particularly creation of a dedicated bearer with the required Quality of Service (QoS) or assigning the communication connection to an existing dedicated bearer which provides the required Quality of Service (QoS). Afterwards the communication source, like a mobile device, can use the communication connection to the communication destination for a data transmission, wherein the communication connection provides the required Quality of Service (QoS) for the type of application initially requesting the communication connection.

According to a further aspect of the invention the method comprises the further step of rejecting the request for establishing the communication connection between the mobile device and the communication destination if the required resources for the communication connection between the mobile device and the communication destination are not available. For example the network element of the communication network sends a notification to the communication source indicating that the communication network cannot provide the required Quality of Service (QoS) for the requested communication connection. In response to this notification the communication source might request a communication connection and indicate in the request for establishing a communication connection between the communication source and the communication destination that the communication connection should be established irrespective whether the communication network can provide the required Quality of Service (QoS) because in some cases a communication connection with a limited Quality of Service (QoS) might be better than no communication connection at all.

According to a further aspect of the invention the types of applications are grouped into different classes of applications by considering the required Quality of Service (QoS) for the communication connection between the mobile device and the communication destination, particularly with respect to the upload and download Quality of Service (QoS) requirements of the mobile device and/or the upload and download Quality of Service (QoS) requirements of the communication destination. By grouping the types of applications into different classes the administrating effort is reduced because the required Quality of Service (QoS) only has to be managed only for a limited number of different classes and not for every possible communication source, like every application possibly running on a mobile device.

According to a further aspect of the invention the different classes of applications comprise an identifier and/or are indexed for an easy management and referencing of the classes of applications.

According to a further aspect of the invention the mobile device includes the type of application and/or class of application requesting the communication connection into the request for establishing the communication connection between the mobile device and the communication destination. By including the type of application and/or class of application into the request for establishing a communication connection send by the communication source to a network element of the communication network the network element can easily determine the type or class of application requesting the communication connection between the communication source and communication destination. The network element only has to examine a corresponding field in the request for establishing a communication connection received from a communication source.

Advantageously the step of determining the type of application or class of application can include according to an aspect of the invention the step of extracting the type of application or class of application from the request for establishing the communication connection between the communication source and the communication destination.

According to a further aspect of the invention the method comprises the step of validating whether the type of application or class of application included in the request for establishing the communication connection between the mobile device and the communication destination is correct. In this way the network element prevents against an erroneous and/or untruly and/or fraudulent indicated type of application and/or class of application in the request for establishing a communication connection send by the communication source. Such an erroneous and/or untruly and/or fraudulent indicated type of application can result in a reserving and/or allocation of network resources of the communication network to provide a Quality of Service (QoS) although the type of application or class of application needs another, particularly lower, Quality of Service (QoS). This can be for example done by examining the communication destination, like e.g. the IP address of the communication destination and/or by examining the details of the communication source, like originating port, and/or by examining the send data packet, for example with respect to the used protocols or the send content. In general all methods mentioned to determine the type of application or class of application executed by the network element can be used to validate the type of application or class of application included in a request for establishing a communication connection between the communication source and the communication destination. Vice versa, all methods mentioned to validate the type of application or class of application included in a request for establishing a communication connection between the communication source and the communication destination can be used by the network element to determine the type of application or class of application.

According to a further aspect of the invention the step of determining the type of application or class of application includes the step of analyzing the request for establishing the communication connection with respect to the communication destination and determining the type of application or class of application by considering the communication destination. It has been found out, that the type of application and/or class of application can be determined in most cases by analyzing the request for establishing the communication connection with respect to the communication destination. Most services are provided by specific servers, for example video services like YouTube or social media services like facebook or Email services like hotmail or googlemail are provided by a limited number of servers and the type of application or class of application requesting the communication connection can be easily determined by examining the communication destination.

According to a further aspect of the invention the method comprises the further step of allocating another network element of the mobile communication network for the communication connection between the mobile device and the communication destination than the network element initially receiving the request for establishing the communication connection between the mobile device and the communication destination. During the check whether a communication connection between the communication source and the communication destination can provide the estimated required Quality of Service (QoS), the network element which initially received the request for establishing the communication connection between the communication source and the communication destination might discover that there already exists another communication destination between the communication source and the communication destination which can provide the estimated required Quality of Service (QoS). In this case the network element involved in the already existing communication connection between the communication source and the communication destination which can provide the estimated required Quality of Service (QoS) will be allocated for the communication connection between the communication source and the communication destination to provide the estimated required Quality of Service (QoS). For example in case of an mobile communication network according to the LTE standard the network element initially receiving a request for establishing a communication connection between a mobile device and a communication destination originating from an application of the mobile device over a first default bearer might discover during checking whether a communication connection between the mobile device and the communication destination can provide the estimated required Quality of Service (QoS) that there exists another default bearer, particularly a dedicated bearer associated to the other default bearer, which can provide the estimated required Quality of Service (QoS). In such a case the communication connection is allocated to the existing network element associated with the other default bearer.

According to a further aspect of the invention the method comprises the further step of broadcasting of types of applications or classes of applications by the network element to mobile devices and/or communication destinations. By broadcasting the types of applications or classes of applications the communication source, the communication destination and the network element involved in the communication connection between the communication source and communication destination all have the same understanding and/or classification of applications. This is especially useful in case the communication source indicates the type or class of application requesting the communication connection to the network element of the communication network and the network element afterwards checks whether the application type or class of application using the communication connection corresponds to the indicated type or class of application contained in the request for establishing the communication connection between the communication source and the communication destination.

According to a further aspect of the invention the method comprises the further step of configuring the types of applications or classes of applications in the mobile device, preferably in a Universal Subscriber Identity Module (USIM), which is part of or inserted into the mobile device, or in Open Mobile Alliance (OMA) Device Management (DM) objects, which are stored in a memory of the mobile device.

According to a further aspect of the invention the method comprises the further step of authenticating the mobile device and checking the permissions of the mobile device to set up a communication connection with the requested Quality of Service (QoS). Thus, the resources of the communication network for the communication connection between the communication source and the communication destination with the required Quality of Service (QoS) are only reserved in case the communication source is authenticated and authorized to establish the communication connection with the requires Quality of Service (QoS).

According to a further aspect of the invention the method comprises the further step of billing the requested communication connection to the mobile device and/or communication destination. The provision of a communication connection between a communication source and a communication destination with a guaranteed Quality of Service (QoS) involves an additional effort of the communication network provider. This additional effort is in many cases linked to an additional billing or included in premium contracts between the communication network provider and its customers. In case a customer uses via a communication source this service the communication network provider has to check whether the customer is allowed to use this service or not and if he is allowed to use the service the communication network provider has to care of billing this service to the customer.

According to a further aspect of the invention the mobile communication network is a mobile communication network according to the GSM-, UMTS-, LTE- or future standard.

According to a further aspect of the invention the mobile device is a mobile phone, smart phone or tablet-PC.

According to a further aspect of the invention the communication destination is a service provider for the mobile device, preferably a server of a service provider, or another communication device. Examples for such service providers are social networks like Facebook or Google+, Video platforms like YouTube, Voice services like Skype, Online-Gaming, and so on.

According to a further aspect of the invention the network element is located at the Packet Data Network Gateway (PGW), preferably at a base transceiver station, Node B or evolved Node B of a mobile communication network.

The object is further solved by a network element designed to perform the method according to the invention. The inventive method can be implemented in existing network elements using software update. Advantageously program code implementing the inventive method is stored in network elements and it is not necessary to change the hardware of existing network elements.

The object is further solved by a mobile device designed to determine a type of application requesting a communication connection between the mobile device and a communication destination and including the determined type of application into a connection request send to a network element of a mobile communication network.

BRIEF DESCRIPTION OF THE DRAWINGS

Further details, characteristics and advantages of the present invention are explained in the following in more detail based on the description of the exemplary embodiments shown in the figures of the drawing. In these figures.

DETAILED DESCRIPTION

Figure 1:
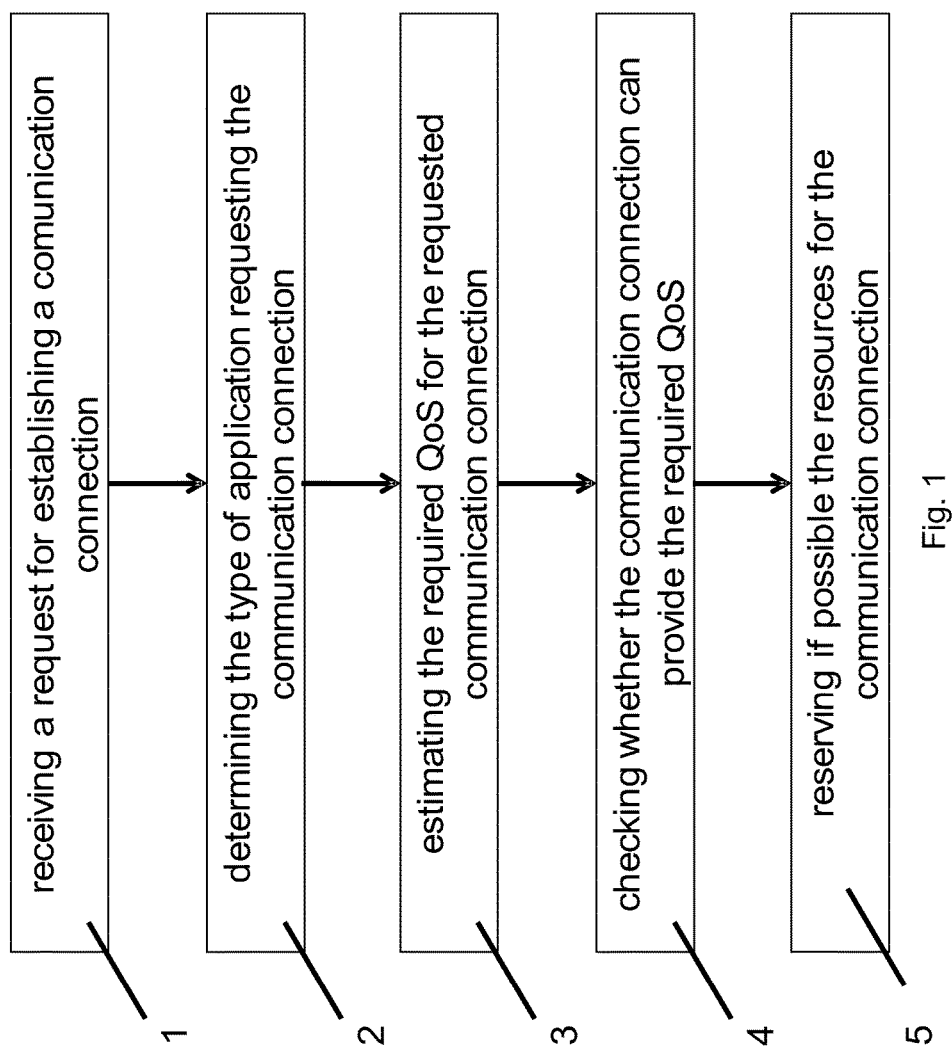
FIG. 1 shows a flow diagram of a first embodiment of an inventive method for resource reservation.

FIG. 1 shows a flow diagram of an inventive method for resource reservation executed by a network element 9 of a mobile communication network 12 for a communication connection between a mobile device 6 and a communication destination 8. First, the network element 9 is receiving 1 a request 7 for establishing the communication connection between the mobile device 6 and the communication destination 8 originating from an application of the mobile device 6. The network element 9 is for example part of a mobile communication network 12 according to the GSM- or UMTS-standard and particularly is an evolved Node B (eNodeB) of a mobile communication network 12 according to an LTE-standard. The mobile device 6 is a mobile phone, smart phone or tablet-PC. An application running on the mobile device 6 sends the request 7 for establishing the communication connection between the mobile device 6 and the communication destination 8 to the communication network 12, which is received 1 by the network element 9 of the communication network 12. The application running on the mobile device 6 can for example request 7 a Voice over IP (VoIP) connection, a connection to a social network, a video connection or any other type of data connection. The communication destination 8 can be a service provider for the mobile device 6, preferably a server of a service provider, or another communication device.

After receiving 1 the request 7 for establishing the communication connection between the mobile device 6 and the communication destination 8 the network element 9 determines 2 the type of application requesting the communication connection between the mobile device 6 and the communication destination 8. The step of determining 2 the type of application requesting the communication connection between the mobile device 6 and the communication destination 8 can comprise in a first alternative the step of extracting the type of application from the request 7 for establishing the communication connection between the mobile device 6 and the communication destination 8. This requires that the mobile device 6, particularly the application running on the mobile device 6, includes the type of application requesting the communication connection into the request 7 for establishing the communication connection between the mobile device 6 and the communication destination 8. With respect to this first alternative the inventive method can comprise the further step of validating whether the type of application included in the request 7 for establishing the communication connection between the mobile device 6 and the communication destination 8 is correct. This validating can for example include the inspection of the data transmitted over the communication connection or further examining the communication destination 8, especially the services provided by the communication destination 8.

In a second alternative the step of determining 2 the type of application requesting the communication connection between the mobile device 6 and the communication destination 8 can comprise the step of analyzing the request 7 for establishing the communication connection with respect to the communication destination 8 and determining the type of application by considering the communication destination 8. Because most services are provided by publicly known servers, for example servers of known service providers like YouTube, Facebook, Google and such a like, the type of application requesting the communication destination 8 between the mobile device 6 and the communication destination 8 can be determined 2 by analyzing the request 7 for establishing the communication connection with respect to the communication destination 8.

In the next step the network element 9 estimates 3 the required Quality of Service (QoS) for the requested communication connection with respect to the upload and/or download requirements under consideration of the type of application requesting the communication connection between the mobile device 6 and the communication destination 8. The required Quality of Service (QoS) for the requested communication connection, especially with respect to the upload and/or download requirements, can be for example estimated 3 by mapping the type of application to an average required Quality of Service (QoS) for the type of application. Such a mapping can be stored in a database 13 of the network element 9 and/or a database 13 of the communication network 12. When estimating the required Quality of Service (QoS) for the requested communication connection the network element 9 can query such a database 13 by sending the determined 2 type of application to the database 13 and receive from the database 13 the estimated 2 required Quality of Service (QoS). The content of such a database 13 can be broadcasted from network element 9 or communication network 12 to other network elements and/or communication network 12 to harmonize the provided respectively required Quality of Service (QoS) for different kinds of applications.

In the next step of the inventive method for resource reservation the network element 9 checks 4 whether the communication connection between the mobile device 6 and the communication destination 8 can provide the estimated 3 required Quality of Service (QoS). This step can involve a communication between the network element 9 receiving 1 the request 7 for establishing the communication connection and further network elements 10 and/or the communication destination 8 to evaluate whether the communication connection can provide the estimated 3 required Quality of Service (QoS). This communication can be based on standardized signaling protocols like the Resource Reservation Protocol (RSVP) according to the RFC 2205 standard.

If possible, the network element 9 reserves 5 the resources for the communication connection between the mobile device 6 and the communication destination 8 to provide the estimated 3 required Quality of Service (QoS). Again, this reservation 5 can be implemented by using standardized signaling protocols like the Resource Reservation Protocol (RSVP) according to the RFC 2205 standard.

According to a further embodiment of the invention the method can comprise the further step of allocating the reserved resources to the requested communication connection between the mobile device 6 and the communication destination 8, particularly creation of a dedicated bearer with the required Quality of Service (QoS) or assigning the communication connection to an existing dedicated bearer which provides the required Quality of Service (QoS).

Preferably the mobile device 6 receives a notification about the reservation and/or allocation of the reserved resources for the communication connection between the mobile device 6 and the communication destination 8.

If the required resources for the communication connection between the mobile device 6 and the communication destination 8 are not available the inventive method can comprise the further step of rejecting the 7 for establishing the communication connection between the mobile device 6 and the communication destination 8. Preferably the mobile device 6 receives a notification of rejection.

The inventive method can comprise the further step of allocating another network element of the mobile communication network 12 for the communication connection between the mobile device 6 and the communication destination 8 than the network element 9 initially receiving 1 the request 7 for establishing the communication connection between the mobile device 6 and the communication destination 8, especially if it is discovered that the network element 9 initially receiving 1 the request 7 for establishing the communication connection cannot provide a communication connection with the required Quality of Service (QoS).

According to a further embodiment of the invention the types of applications are grouped into different classes of applications by considering the required Quality of Service (QoS) for the communication connection between the mobile device 6 and the communication destination 8, particularly with respect to the upload and download Quality of Service (QoS) requirements of the mobile device 6 and/or the upload and download Quality of Service (QoS) requirements of the communication destination 8. This simplifies the handling of different types of applications because the network element 9 and/or the mobile device 6 and/or the communication destination 8 do not have distinguish between every single application but only has do distinguish different classes of applications with similar Quality of Service (QoS) requirements. This grouping of applications can also be performed with respect to the embodiment shown in FIG. 1, wherein the reference to the type of application has to be replaced by the class of application. To further simplify the handling of the classes of applications the different classes of applications comprise an identifier and/or are indexed for an easy reference. The different classes of applications or the types of applications can also be broadcasted between the mobile device 6, the network element 9, the communication network 12 and/or the communication destination 8, especially by the communication network 12 respectively the network element 9, to harmonize the different classes of applications or types of applications.

The inventive method can further comprise the steps of authenticating the mobile device 6 and checking the permissions of the mobile device 6 to set up a communication connection with the requested Quality of Service (QoS). In this the communication network 12 respectively the network element 9 can verify that only authorized mobile devices 6 can establish and use a communication connection with a specific Quality of Service (QoS).

Furthermore, the inventive method can comprise the step of billing the requested communication connection to the mobile device 6 and/or communication destination 8. Since a communication connection with a guaranteed Quality of Service (QoS) can be regarded as a premium service offered by the communication network 12 provider it is likely that the communication network 12 provider charge this service to either the mobile device 6 or the communication destination 8.

Figure 2:
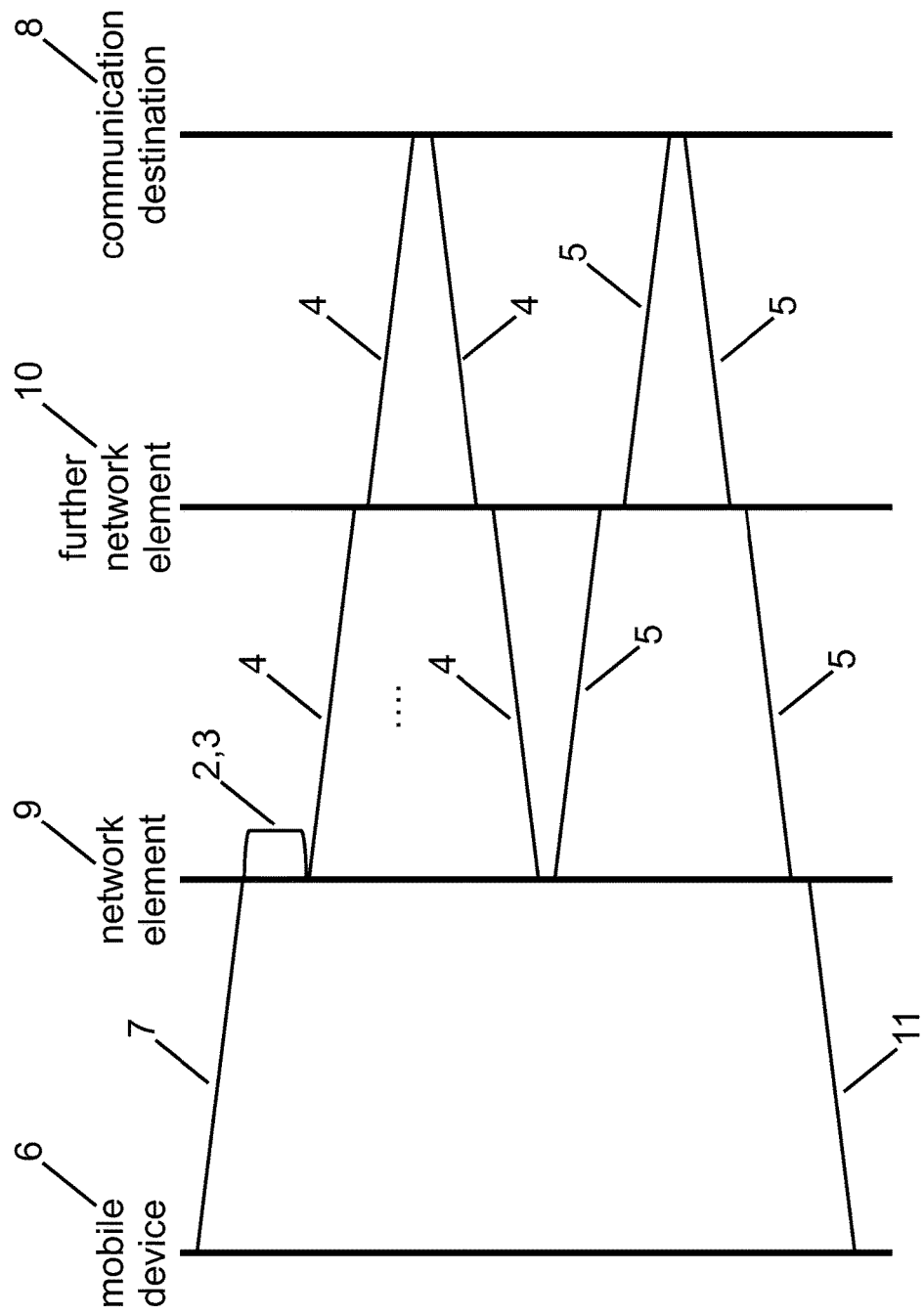
FIG. 2 shows a schematic view of a second embodiment of an inventive method for resource reservation.

FIG. 2 shows a schematic view of a second embodiment of an inventive method for resource reservation. As shown in FIG. 2 the mobile device 6 sends a request 7 for establishing a communication connection between the mobile device 6 and a communication destination 8 to a communication network 12, particularly to a network element 9 of the communication network 12. Preferably the request 7 for establishing the communication connection between the mobile device 6 and the communication destination 8 originates from an application running on the mobile device 6.

The network element 9 receives 1 the request 7 originating from the application running on the mobile device 6 for example over a default bearer established between the mobile device 6 and the network element 9. Afterwards the network element 9 determines 2 the type of application requesting the communication connection between the mobile device 6 and the communication destination 8 and estimates 3 the required Quality of Service (QoS) for the requested communication connection with respect to the upload and/or download requirements under consideration of the type of application requesting the communication connection between the mobile device 6 and the communication destination 8.

Next, the network element 9 checks whether the communication connection between the mobile device 6 and the communication destination 8 can provide the estimated required Quality of Service (QoS). Usually a communication connection between a communication source like a mobile device 6 and a communication destination 8 is established via a network element 9 receiving 1 the request 7 for establishing the communication connection and one or more further network elements 10. The step of checking 4 whether the communication connection can provide the estimated required Quality of Service (QoS) involves sending for example signaling messages from the network element 9 to one or more further network elements 10 and eventually to the communication destination 8 and back to the network element 9. The signaling messages can use e.g. the Resource Reservation Protocol (RSVP) according to the RFC 2205 standard.

In case the communication connection between the mobile device 6 and the communication destination 8 can provide the estimated required Quality of Service (QoS) the network element 9 reserves 5 the resources for the communication connection between the mobile device 6 and the communication destination 8 to provide the required Quality of Service (QoS). The reserving again can comprise the step of sending signaling messages along the communication path between the network element 9 receiving 1 the request 7 for establishing the communication connection and further network elements 10 and eventually to the communication destination 8 and back to the network element 9.

Whether signaling messages for checking 4 and reserving 5 are also send to the communication destination depends on the type of communication destination and the further network element 10 serving the communication destination 8. In case the further network element 10 serving the communication destination can guarantee the required Quality of Service towards the communication destination 8 there is no need to send signaling messages for checking 4 and reserving 5 towards the communication destination 8.

After reserving the resources for the communication connection between the mobile device 6 and the communication destination 8 to provide the required Quality of Service (QoS) the network element 9 notifies 11 the mobile device 6 about the reservation of the resources.

Figure 3:
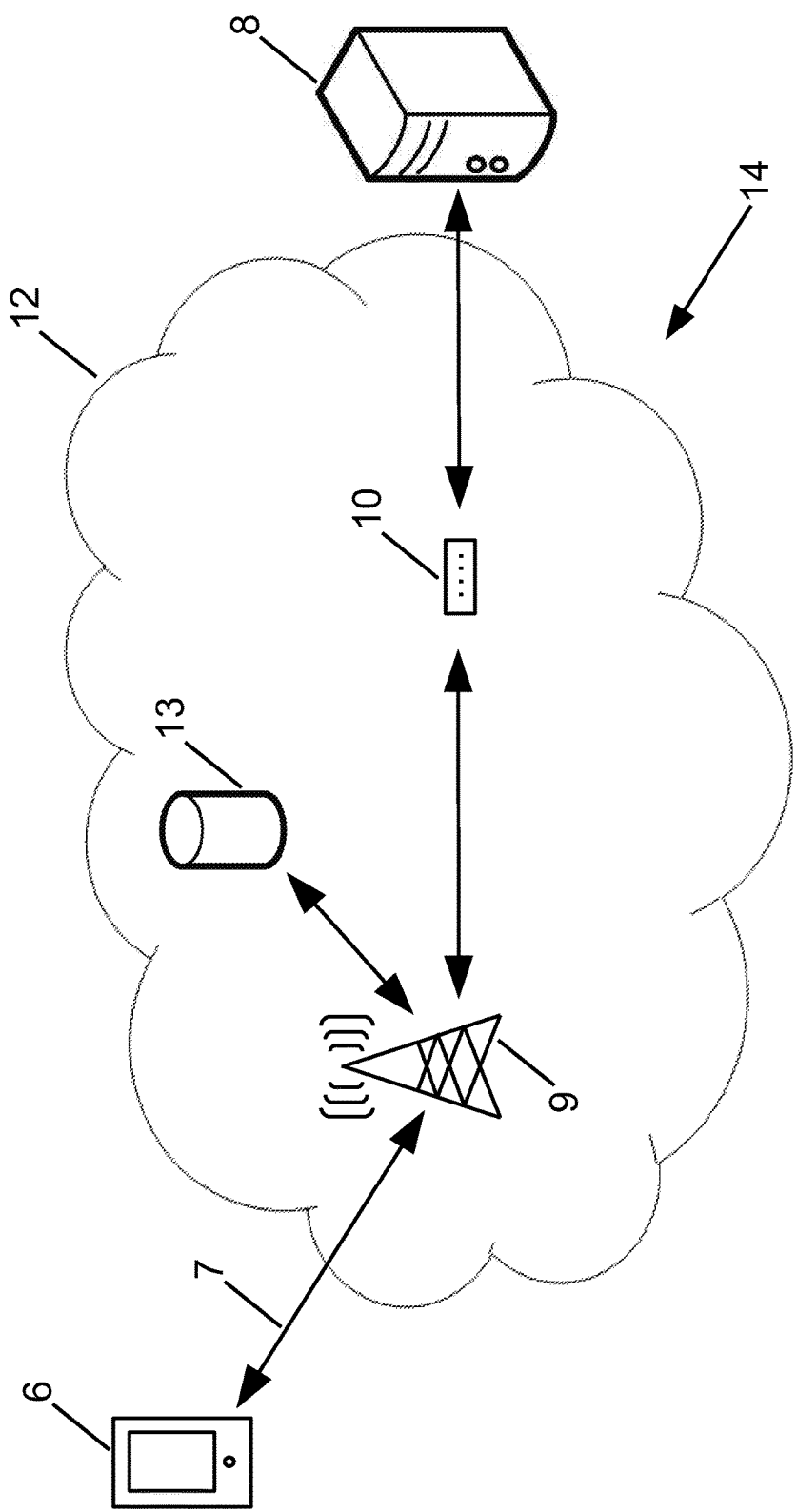
FIG. 3 shows a system comprising a mobile device according to the invention and a communication network with a network element according to the invention element.

FIG. 3 shows a system 14 comprising a mobile device 6 according to the invention and a communication network 12 with a network element 9 according to the invention element.

An application running on the mobile device 6 sends a request 7 for establishing a communication connection between the mobile device 6 and a communication destination 8 to a communication network 12, particularly to a network element 9 of the communication network 12. The communication network 12 shown in FIG. 3 is a mobile communication network 12, preferably according to the LTE-standard and the network element 9 is an evolved Node B of the LTE communication network 12.

The network element 9 receives 1 the request 7 for establishing the communication connection between the mobile device 6 and the communication destination 8. As explained above with respect to the embodiments shown in FIG. 1 and FIG. 2 the network element 9 determines 2 the type of application or class of application requesting the communication connection between the mobile device 6 and the communication destination 8.

Once the network element 9 knows the type of application or class of application the network element 9 estimates 3 the required Quality of Service (QoS) for the requested communication connection with respect to the upload and/or download requirements under consideration of the type of application or class of application requesting the communication connection between the mobile device 6 and the communication destination 8. The step of estimating 3 can involve the step of querying a database 13, which maps types of applications or classes of applications to a corresponding required Quality of Service (QoS).

Afterwards the network element 9 checks 4 whether the communication connection between the mobile device 6 and the communication destination 8 can provide the estimated required Quality of Service (QoS). As already explained above with respect to the embodiment shown in FIG. 2 this might involve communicating with further network elements 10, preferably using a signaling protocol like the resource Reservation Protocol (RSVP). The one or more further network elements 10 can be located inside the same communication network 12 as the network element 9 receiving the request 7 for establishing the communication connection or can also be located in another communication network, e.g. like the Internet. The further network elements 10 can be for example routers in the Internet.

The communication destination 8 can also be located inside the same communication 12 as the network element 9 receiving the request 7 for establishing the communication connection or in another communication network like the Internet. In the embodiment shown in FIG. 3 the communication destination is located outside of the communication network 12, preferably in the Internet.

In the embodiment shown in FIG. 3 the communication destination is a publicly available Server providing a service like e.g. a social network or video downloads.

The exemplary embodiments of the invention shown in the figures of the drawing and explained in connection with the description merely serve to explain the invention and are in no way restrictive.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. Any reference signs in the claims should not be construed as limiting the scope.

LIST OF REFERENCES 1 receiving request for establishing a communication connection
2 determining the type of application
3 estimating the required Quality of Service
4 checking the communication connection
5 reserving resources for the communication connection
6 mobile device
7 request for establishing a communication connection
8 communication destination
9 network element
10 further network element
11 notification to mobile device
12 communication network
13 database
14 System according to the invention

What is claimed is:

1. A method for resource reservation executed by a network element of a mobile communication network for a communication connection between a mobile device and a communication destination, the method comprising the steps of:
  receiving a request for establishing the communication connection between the mobile device and the communication destination originating from an application of the mobile device;
  determining a type of application requesting the communication connection between the mobile device and the communication destination;
  estimating a required Quality of Service (QoS) for the requested communication connection with respect to upload and/or download requirements under consideration of the type of application requesting the communication connection between the mobile device and the communication destination;
  checking whether the communication connection between the mobile device and the communication destination can provide an estimated required Quality of Service (QoS); and
  reserving resources for the communication connection between the mobile device and the communication destination to provide the required Quality of Service (QoS);
  allocating the reserved resources to the requested communication connection between the mobile device and the communication destination including creation of a dedicated bearer with the required Quality of Service (QoS) or assigning the communication connection to an existing dedicated bearer which provides the required Quality of Service (QoS).

2. The method according to claim 1, further comprising the step of rejecting the request for establishing the communication connection between the mobile device and the communication destination if required resources for the communication connection between the mobile device and the communication destination are not available.

3. The method according to claim 1, wherein the types of applications are grouped into different classes of applications by considering the required Quality of Service (QoS) for the communication connection between the mobile device and the communication destination, with respect to the upload and download Quality of Service (QoS) requirements of the mobile device and/or the upload and download Quality of Service (QoS) requirements of the communication destination.

4. The method according to claim 3, wherein each of the different classes of applications comprises an identifier and/or are indexed.

5. The method according to claim 1, wherein the mobile device includes the type of application and/or class of application requesting the communication connection into the request for establishing the communication connection between the mobile device and the communication destination.

6. The method according to claim 5, wherein the step of determining the type of application or class of application includes the step of extracting the type of application or class of application from the request for establishing the communication connection between the mobile device and the communication destination.

7. The method according to claim 5, further comprising the step of validating whether the type of application or class of application included in the request for establishing the communication connection between the mobile device and the communication is correct.

8. The method according to claim 1, wherein the step of determining the type of application or class of application includes the step of analyzing the request for establishing the communication connection with respect to the communication destination and determining the type of application or class of application by considering the communication destination.

9. The method according to claim 1, further comprising the step of allocating another network element of the mobile communication network for the communication connection between the mobile device and the communication destination other than the network element initially receiving the request for establishing the communication connection between the mobile device and the communication destination.

10. The method according to claim 1, further comprising the step of broadcasting of types of applications or classes of applications by the network element to mobile devices and/or communication destinations.

11. The method according to claim 1, further comprising the step of configuring the types of applications or classes of applications in the mobile device in a Universal Subscriber Identity Module (USIM) or in Open Mobile Alliance (OMA) Device Management (DM) objects.

12. The method according to claim 1, further comprising the steps of authenticating the mobile device and checking the permissions of the mobile device to set up a communication connection with the requested Quality of Service (QoS).

13. The method according to claim 1, further comprising the step of billing the requested communication connection to the mobile device and/or communication destination.

14. The method according to claim 1, wherein the mobile communication network is a mobile communication network according to the GSM-, UMTS-, or LTE-standard.

15. The method according to claim 1, wherein the mobile device is a mobile phone, smart phone or tablet-PC.

16. The method according to claim 1, wherein the communication destination is a service provider for the mobile device.

17. The method according to claim 1, wherein the network element is located at the Packet Data Network Gateway (PGW), at a base transceiver station, Node B or evolved Node B of a mobile communication network.

18. A network element designed to:
receive a request for establishing the communication connection between the mobile device and the communication destination originating from an application of the mobile device;
determine a type of application requesting the communication connection between the mobile device and the communication destination;
estimate a required Quality of Service (QoS) for the requested communication connection with respect to upload and/or download requirements under consideration of the type of application requesting the communication connection between the mobile device and the communication destination;
check whether the communication connection between the mobile device and the communication destination can provide an estimated required Quality of Service (QoS); and
reserve resources for the communication connection between the mobile device and the communication destination to provide the required Quality of Service (QoS);
allocate the reserved resources to the requested communication connection between the mobile device and the communication destination including creation of a dedicated bearer with the required Quality of Service (QoS) or assigning the communication connection to an existing dedicated bearer which provides the required Quality of Service (QoS).

19. The network element of claim 18 implemented as a mobile device designed to determine a type of application requesting a communication connection between the mobile device and a communication destination and including the determined type of application into a connection request send to a network element of a mobile communication network.

* * * * *